UNITED STATES PATENT OFFICE.

EMIL LESSER, OF LONDON, COUNTY OF MIDDLESEX, ENGLAND, ASSIGNOR OF ONE-FIFTH TO FRANK A. ABRAHAM, OF SAME PLACE.

PROCESS OF MANUFACTURING GLUE, &c.

SPECIFICATION forming part of Letters Patent No. 246,158, dated August 23, 1881.

Application filed November 9, 1880. (No specimens.)

*To all whom it may concern:*

Be it known that I, EMIL LESSER, of the city of London, county of Middlesex, England, Great Britain, have invented an Improved Process of Manufacturing Glue and Size from Starch and Carrageen Moss or Gum-Dragon, which I term "Glucin," of which the following is a specification.

This substance glucin is intended to be used in place of ordinary glue, starch, gum, &c., for sizing yarns, finishing various descriptions of textile goods, the manufacture of wall and other papers, by painters and decorators, for distempering, &c., for the pasting of books, for caskbinding, and similar purposes.

My invention consists in forming a compound of potato-starch and carrageen moss or gum-dragon, extracting the gluten of this compound by the action of alkalies, and then neutralizing it by means of nitric and other acids; also, in the addition of vegetable acids for preserving its strength, and various additional materials, according to the article on which it is to be used.

My process of manufacture is as follows: I first prepare a jelly from carrageen moss by boiling it in the ordinary manner, or I dissolve a certain quantity of gum-dragon. I then add potato-flour and mix the two together in a stirring apparatus especially constructed for the mixing of such semi-solid substances. I next add some caustic soda and potash—in some instances a certain quantity of sulphate of soda, bisulphate of soda, and a solution of colophony or rosin in alcohol—and continue mixing until the desired consistency is attained, after which I neutralize it by mixing with it a solution of nitric or other acids, and finally I add to it some vegetable acid—such as acetic or citric acid—in order that the compound or glucin thus formed may retain its original glutinous strength. In some instances, however, I add for this purpose a solution of chloride of magnesium, epsom or other salts. These additions of acids or chloride of magnesium, epsom, or similar salts, are for the very essential purposes of keeping this glucin compound moist and free from evaporation and mold, which properties do not exist in any glues and sizes prepared by the digestion of animal matter.

In addition to the above, when this glucin is required for sizing and finishing bleached goods—such as cotton, linen, and jute materials—I mix with it, before commencing the neutralizing process, some sulphuric ether or chloric or nitric ether, so that the brightness of the colors of the articles named should not in any way be affected. Also, when this glucin compound is required as a size—such as that used by painters—I add, in addition to the materials already mentioned, for securing a proper moisture to the mixture, some dextrine, solution of chloride of magnesium, and glycerine.

The carrageen moss used in the preparation of this compound serves to fill up the materials on which it may be used, also to keep such materials soft and pliable, and strengthen the threads of which they are composed, so as to hold them better in the weaving-looms. Without the addition of this moss in the manufacture of this size the resulting compound would become brittle on application to various articles for pasting and break off on drying.

I make no claim to a process of manufacturing glue from the gluten of potato-starch by the action of alkalies, (the resulting product being treated with salts alone or salts and acids,) as I am aware that this is not new, such process having been described in an English Patent No. 520, August 7, 1879; nor in the present application do I claim the additional steps or processes of adding the ether for preserving the brightness of colors when the glucin is employed in sizing and finishing bleached goods, and of adding dextrine, chloride of magnesium, and glycerine for painting; nor the products resulting from these additional steps, as I reserve the right of making the same the subjects of subsequent applications; but

What I claim, and desire to secure by Letters Patent of the United States, is—

1. The process of manufacturing glucin herein described, consisting of the following steps—viz: first, making a compound of potato-starch and carrageen moss or gum-dragon; second, extracting the gluten of this compound by the action of alkalies; third, neutralizing the resulting products by acids; and, finally, adding thereto vegetable acids to retain the original strength, volume, and glutinous property of the compound, ether for preserving the brightness of colors, when used in sizing bleached goods, and dextrine, chloride of magnesium, and glycerine, when used for painting.

2. The product herein described, composed of gluten extracted from a compound of potato-starch and carrageen moss or gum-dragon, in combination with vegetable acids, ether, dextrine, chloride of magnesium, and glycerine, substantially as described.

3. The product herein described, composed of gluten extracted from a compound of potato-starch, carrageen moss, or gum-dragon, in combination with vegetable acids, substantially as described.

4. The product herein described, composed of gluten extracted from a compound of potato-starch, carrageen moss, or gum-dragon, in combination with ether, substantially as described.

5. The product herein described, composed of gluten extracted from a compound of potato-starch, carrageen moss, or gum-dragon, in combination with dextrine, chloride of magnesium, and glycerine, substantially as described.

EMIL LESSER.

Witnesses:
LIONEL VARICAS,
JAS. PARKINSON.